United States Patent [19]
DuCharme et al.

[11] 4,274,514
[45] Jun. 23, 1981

[54] PIN SLIDER DISC BRAKE

[75] Inventors: Robert T. DuCharme; Robert E. Herzog, both of South Bend, Ind.

[73] Assignee: The Bendix Corporation, Southfield, Mich.

[21] Appl. No.: 78,854

[22] Filed: Sep. 26, 1979

Related U.S. Application Data

[63] Continuation of Ser. No. 937,679, Aug. 28, 1978, abandoned.

[51] Int. Cl.³ .................................. F16D 55/224
[52] U.S. Cl. ................................................. 188/73.3
[58] Field of Search ........................... 188/72.4, 73.3

[56] References Cited

U.S. PATENT DOCUMENTS

| Re. 29,582 | 3/1978 | Brown | 188/73.3 |
|---|---|---|---|
| 3,375,906 | 4/1968 | Hayes | 188/73.3 |
| 3,616,877 | 11/1971 | Collins | 188/73.3 |
| 3,628,639 | 12/1971 | Daley | 188/73.3 |
| 3,734,248 | 5/1973 | Fay | 188/73.3 |
| 4,193,481 | 3/1980 | Wunderlich | 188/73.3 |

FOREIGN PATENT DOCUMENTS 2338361  2/1974  Fed. Rep. of Germany .......... 188/72.4

*Primary Examiner*—Edward R. Kazenske
*Attorney, Agent, or Firm*—Paul David Schoenle; Ken C. Decker

[57] ABSTRACT

A disc brake assembly includes a torque member which carries at least one pin for slidably supporting a caliper. The one pin threadably engages the torque member and extends on both sides of the disc. A pair of friction elements are engageable with the disc to retard rotation of the latter. On one side of the disc the one pin slidably engages the caliper, while on the other side of the disc the one pin slidably engages one of the pair of friction elements. The one pin is spaced from the caliper on the other side of the disc where the one pin engages one of the pair of friction elements. The one pin cooperates with a resilient bushing on the caliper to form a sliding connection therebetween and also cooperates with a resilient bushing on the one friction element to form a sliding connection therebetween. An optional thermoplastic sleeve may be disposed between the resilient bushing on the caliper and the one pin.

1 Claim, 3 Drawing Figures

PIN SLIDER DISC BRAKE

This is a continuation of application Ser. No. 937,679, filed Aug. 28, 1978, now abandoned.

BACKGROUND OF THE INVENTION

In general a pin slider disc brake, such as illustrated in U.S. Pat. Nos. 3,375,906 and 3,628,639, provides a pair of pins which extend from a torque member to slidably carry a caliper. Each pin forms a slidable connection on both sides of the disc with the caliper so that the caliper requires a pair of coaxial openings for receiving each pin. Consequently, the caliper of the prior art pin slider disc brake includes a pair of radially outwardly extending flanges so as to form the pair of coaxial openings. As a result the outwardly extending flanges take up space so that the construction is not compatible with the small space available for many small cars, especially those cars with front wheel drive.

In addition, the pin slider disc brake of the prior art utilizes a resilient ring or grommet to form a sliding connection between the pair of pins and the caliper so that the metal pins slidably engage the resilient rings.

SUMMARY OF THE INVENTION

The invention herein discloses a caliper which forms a single sliding connection with each pin in a pin slider disc brake. In particular, the caliper slidably engages at least one pin on the side of the disc which also includes a hydraulic actuator carried by the caliper and referred to as the inner side. The one pin extends to the outer side to slidably engage an outer friction element while remaining spaced from the caliper on the outer side. The outer friction element includes projections which cooperate with the caliper to transfer torque developed by the outer friction element to the caliper.

Moreover, the one pin optionally includes a thermoplastic sleeve and the caliper carries a resilient bushing with an opening for receiving the optional thermo-plastic sleeve. The outer friction element also carries a resilient bushing with an opening for receiving the one pin. The thermo-plastic sleeve cooperates with the resilient bushing to form the slidable engagement between the caliper and the one pin.

It is an object of the present invention to provide a pin slider disc brake which is compactly structured to fit between a small car frame and wheel assembly.

It is an additional object of the present invention to provide a disc brake assembly which accommodates manufacturing tolerances by providing an opening in the outer friction element to receive a pin slider disc brake.

DETAILED DESCRIPTION

Figure 1:
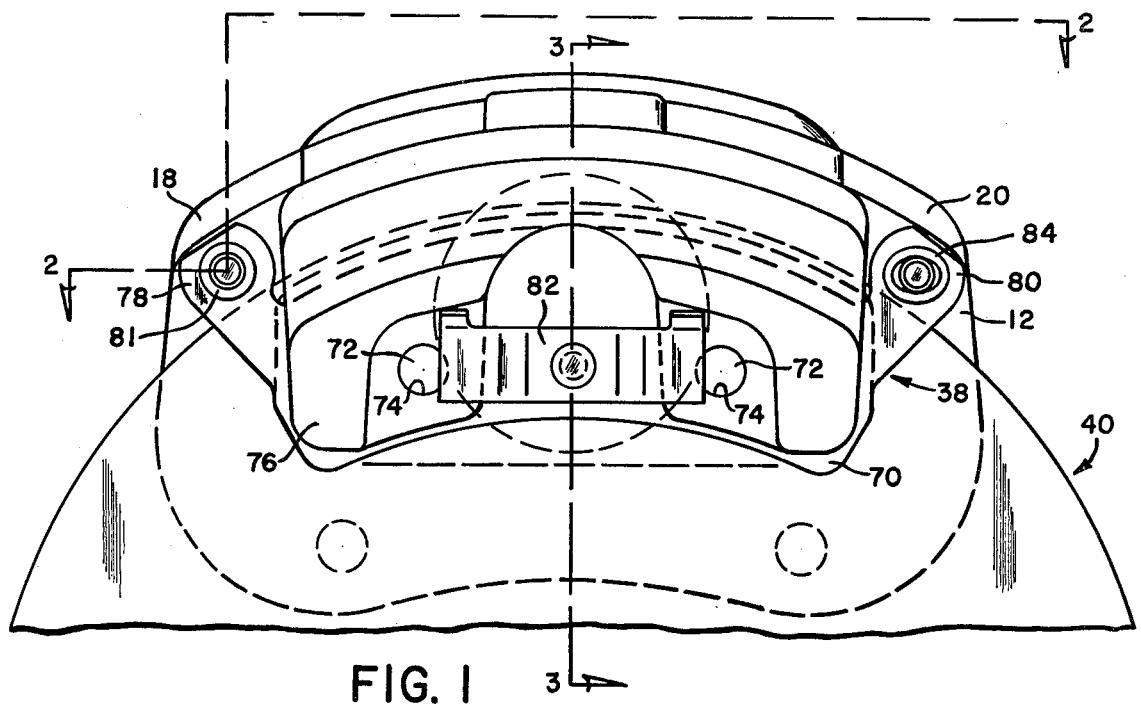
FIG. 1 is an end view of a disc brake assembly.

A disc brake assembly 10 includes a torque member 12 which is secured to a non-rotatable portion of a frame 14 via bolts 16. The torque member is substantially U-shaped to form a pair of radially extending arms 18 and 20. The arms form bores at 22 and 24 and the left arm 18 includes an axially extending flange 26; however, it is possible to also provide an axially extending flange for the right arm 20. The bore 22 is disposed in the flange 26 to receive a pin 28 while the bore 24 receives a pin 30. A caliper assembly 32 is slidably carried by the pins and a hydraulic actuator 34 carried by the caliper assembly 32 cooperates with a pair of brake shoes 36 and 38 to urge the latter into frictional engagement with a disc or rotor 40.

Figure 2:
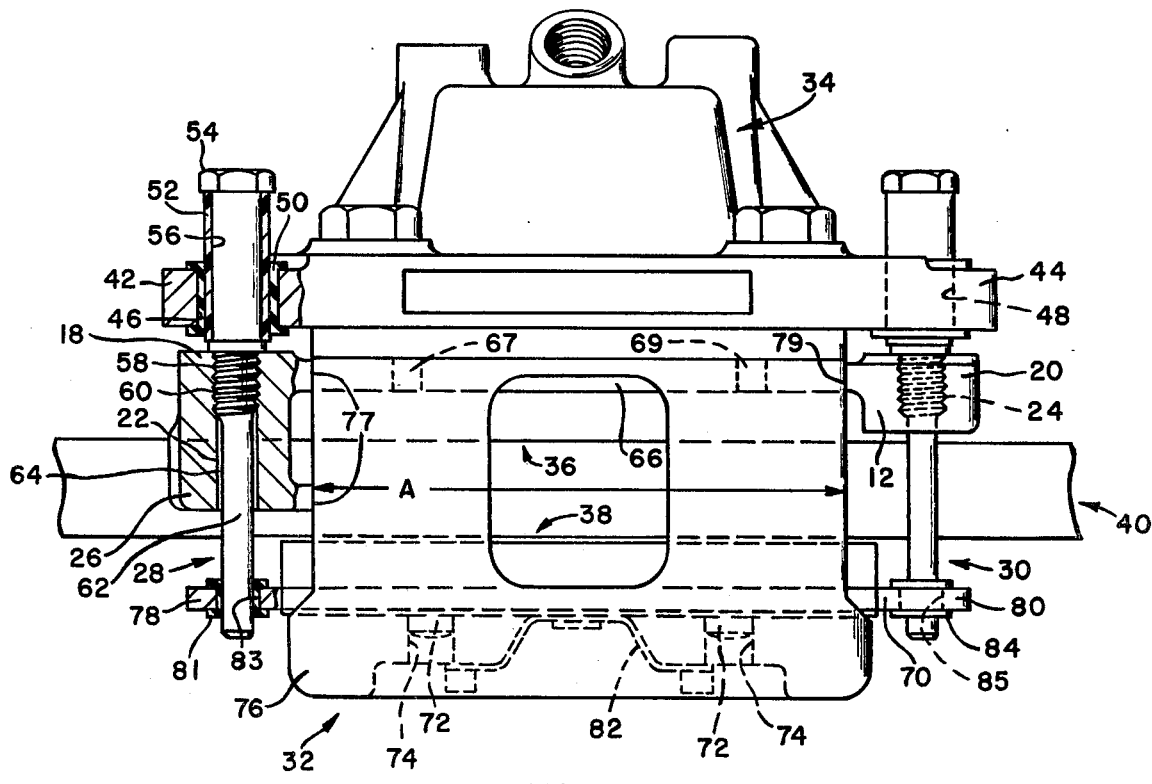
FIG. 2 is a top view of the disc brake assembly of FIG. 1 with the portion along line 2—2 of FIG. 1 being cut away.
Figure 3:
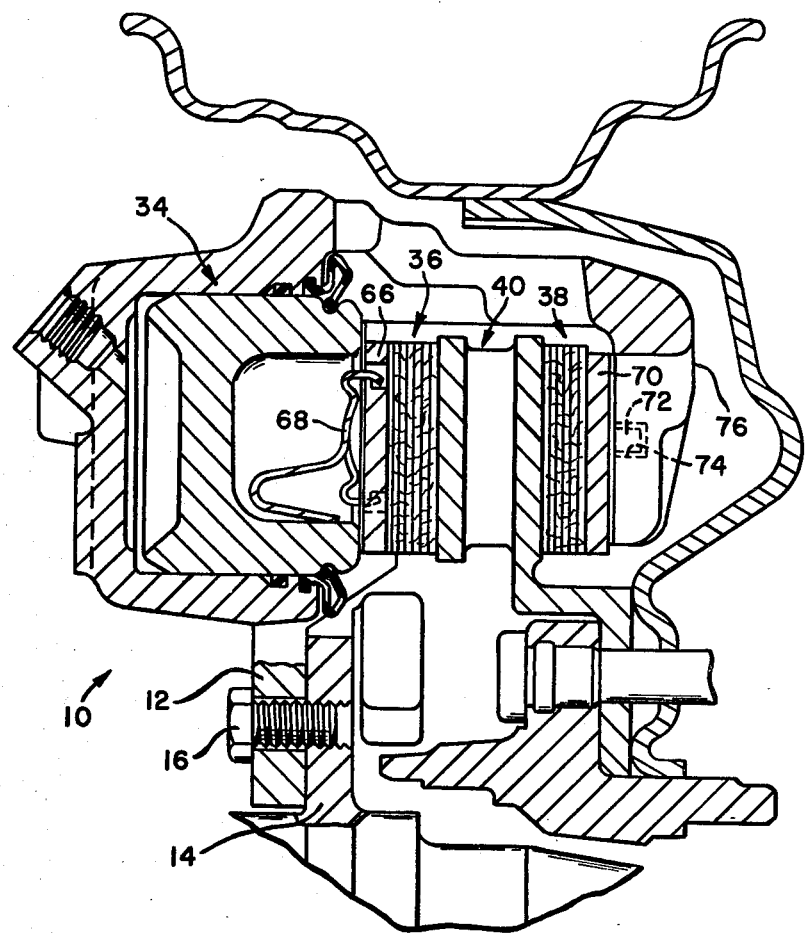
FIG. 3 is a cross-sectional view of FIG. 1 taken along line 3—3 of FIG. 1.

Turning to FIG. 2, the caliper assembly 32 includes a pair of radially extending flanges at 42 and 44 which form openings 46 and 48. Viewing the left radial flange 42, as the right flange 44 is constructed similarly, the opening 46 receives a resilient bushing 50, such as a rubber grommet, and the pin 28 may optionally carry a thermo-plastic sleeve 52 to enhance sliding with the resilient bushing 50. The thermo-plastic sleeve 52 extends through an opening on the resilient bushing 50 and cooperates with the latter to form a sliding connection between the pin 28 and the caliper 32.

The pin 28 forms a head 54 and an adjoining recess 56 to receive the thermo-plastic sleeve 52. A threaded portion of the pin 28 at 58 is engageable with a threaded portion of the bore 22 at 60. In addition, a second portion 62 of the pin 28 forms a close fit with a second portion 64 of the bore 22. A small clearance between portions 62 and 64 is provided to accommodate manufacturing tolerances upon insertion of the pin 28 into the bore 22.

In the inner brake shoe 36 includes a backing plate 66 which fits within the opening formed by the U-shaped torque member 12. Consequently, braking torque developed by the inner brake shoe 36 is transmitted directly to the torque member 12. Moreover, the inner brake shoe 36 releasably carries a spring 68 to retain the inner brake shoe in abutment with the underside of the caliper assembly via tabs 67 and 69 extending from the backing plate 66 so as to eliminate rattle generated by the inner brake shoe. The outer brake shoe 38 also includes a backing plate 70 which is formed with projections 72. The projections extend into apertures 74 which are provided on a radially inwardly extending leg 76 of the caliper assembly 32. The projections extend into apertures 74 which are provided on a radially extending leg 76 of the caliper assembly 32. As a result braking torque developed by the outer brake shoe 38 is transmitted to the caliper assembly 32 which in turn transmits braking torque to the axially extending flange 26 via an abutment interface between the caliper assembly and the axially extending flange at 77. Consequently, substantially no braking torque is transmitted to the pins 28 and 30, even though the resilient bushings 50, 81, and 84 may be deformed during braking. A pair of radially outwardly extending ears at 78 and 80 on the friction element 38 carry the resilient bushings 81 and 84 within openings 83 and 85 for receiving the pins 28 and 30, respectively. The resilient bushings form a spacing between the pin and the wall of the openings 83 to permit slight movement of the brake shoe 38 without transferring any torque to the pin portion 62. The opening on the bushing 81 or the opening on the bushing 84, or both, may be elliptical to accommodate manufacturing eccentricities between the pins 28 and 30. The outer brake shoe 38 releasably couples to a spring 82 for retaining the outer brake shoe in abutment with the radially inwardly extending leg 76 of the caliper.

If the disc or rotor 40 is rotating in a reverse direction, such as when a vehicle is backing up, the torque member 12 includes a second abutment interface at 79 with the caliper assembly 32 to absorb braking torque generated through the caliper assembly during braking. The abutment interface at 77 is partially formed by at least two projections on the axially extending flange 26 while the abutment interface at 79 is formed by only one projection on the arm 20 as more braking torque will be developed during forward rotation of the disc 40 than reverse rotation of the latter.

In accordance with the invention, it is seen, viewing FIG. 2, that the caliper assembly 32 forms a single sliding connection with each pin 28 and 30 via the radially extending flanges 42 and 44 and the pins 28 and 30 are spaced from the caliper 32 on the axially outer side of the torque member 12. Consequently, the transverse width A, of the caliper 32 is substantially uniform from the radially extending flanges 42 and 44, but not inclusive thereof, to and including the radially inwardly extending leg 76. In other words, the caliper transverse width A is less than the transverse distance between the pins 28 and 30, provided the transverse width A is measured axially outside of the flanges 42 and 44.

In addition, the outer friction element 38 includes openings 83 and 85 for receiving the pins 28 and 30. These openings are provided in the radially outwardly extending ears 78 and 80 on the outer friction element, so that the concentricity between the openings 46, 48, and 83, 85, respectively, is maintained in the absence of openings being required in the caliper assembly leg 76. In contrast thereto, the prior art generally requires two sliding connections between the caliper and each pin so that two openings on the caliper assembly are required to be concentric for receiving the pin. As a result, the disc brake assembly of the present invention is believed to be easier to manufacture with respect to accommodating manufacturing tolerances, in comparison to the prior art pin slider disc brakes.

Furthermore, if the thermo-plastic sleeve is provided, the resilient bushing cooperates with the thermo-plastic sleeve to form a sliding connection between the caliper and pin to accomodate axial movement of the caliper as the hydraulic actuator is operated to urge the pair of brake shoes into frictional engagement with the rotor. Otherwise, the resilient bushing forms a single sliding connection with the pin 28. The disc brake 10 operates in a conventional manner to retard rotation of the rotor.

The foregoing description is directed to the left pin 28 and flange 42; however, the right pin 30 may carry a thermo-plastic sleeve which cooperates with a resilient bushing on the flange 44 in the same manner as the sleeve and bushing, 52 and 50, respectively.

Many variations of the present invention are feasible by one skilled in the art and, as such, these variations are intended to fall within the scope of the appended claims.

We claim:

1. In a disc brake assembly having a torque member which is fixedly coupled to a vehicle frame adjacent a rotatable disc, a caliper movably disposed relative to the torque member and extending over a portion of the periphery of the disc, a pair of brake shoes which are movable into engagement with the disc, and at least one pin cooperating with the torque member and the caliper to form a slidable collection therebetween, the improvement wherein the torque member includes a flange extending axially over the periphery of the disc, said flange including a bore for receiving the one pin, said flange also defining an abutment surface slidably engageable with said caliper to absorb braking torque, said bore extending through said flange adjacent said abutment surface and including a first portion threadably engaging the one pin and a second adjoining portion defining a clearance with the one pin, said slidable connection being defined by a thermoplastic sleeve on the one pin and a resilient bushing on the caliper, said resilient bushing forming an opening to slidably receive said thermo-plastic sleeve, and the one pin threadably engaging the torque member and including a recess to carry and retain said thermo-plastic sleeve independently of the torque member.

* * * * *